(12) United States Patent
Jindal et al.

(10) Patent No.: US 11,381,506 B1
(45) Date of Patent: Jul. 5, 2022

(54) ADAPTIVE LOAD BALANCING FOR DISTRIBUTED SYSTEMS

(71) Applicant: Amazon Technologies, Inc., Seattle, WA (US)

(72) Inventors: Himanshu Jindal, Seattle, WA (US); Christoph Saalfeld, Seattle, WA (US)

(73) Assignee: Amazon Tehonlogies, Inc., Seattle, WA (US)

( * ) Notice: Subject to any disclaimer, the term of this patent is extended or adjusted under 35 U.S.C. 154(b) by 0 days.

(21) Appl. No.: 16/833,327

(22) Filed: Mar. 27, 2020

(51) Int. Cl.
```
H04L 47/125    (2022.01)
H04L 45/24     (2022.01)
H04L 67/1029   (2022.01)
H04L 67/1025   (2022.01)
G06F 11/34     (2006.01)
G06N 20/00     (2019.01)
```

(52) U.S. Cl.
CPC ........ H04L 47/125 (2013.01); G06F 11/3433 (2013.01); H04L 45/24 (2013.01); H04L 67/1025 (2013.01); H04L 67/1029 (2013.01); G06N 20/00 (2019.01)

(58) Field of Classification Search
CPC ..... G06N 20/00; G06F 11/3433; H04L 45/24; H04L 47/125; H04L 67/1025; H04L 67/1029

See application file for complete search history.

(56) References Cited

U.S. PATENT DOCUMENTS

```
8,843,630  B1 *  9/2014  Thomas ............... H04L 67/42
                                                   709/226
9,118,571  B2    8/2015  Bisht et al.
9,749,286  B2    8/2017  Lim et al.
9,843,631  B2 * 12/2017  Parakh ............... H04L 67/1008
2010/0312877 A1 * 12/2010 Xie .................... H04L 63/1408
                                                   709/224
2015/0358236 A1   12/2015  Roach et al.
2018/0048607 A1 *  2/2018  Jayam ................. H04L 51/22
2020/0084269 A1 *  3/2020  Husar ................. H04L 45/7453
```

FOREIGN PATENT DOCUMENTS

```
CN    108769102  A  * 11/2018
WO    WO-0239215 A2 *  5/2002   ......... H04L 12/1818
```

OTHER PUBLICATIONS

Amazon Web Services, Inc. "Elastic Load Balancing: Application Load Balancers", 2017, 81 pages. (Year: 2017).*
Amazon Web Services, Inc. "Elastic Load Balancing: User Guide", 2017, 17 pages. (Year: 2017).*
Amazon Web Services, Inc. "Amazon EC2 Instance Types", publicly posted Mar. 20, 2019, 8 pages. (Year: 2019).*

* cited by examiner

Primary Examiner — George C Neurauter, Jr.
(74) Attorney, Agent, or Firm — Robert C. Kowert; Kowert, Hood, Munyon, Rankin & Goetzel, P.C.

(57) ABSTRACT

Adaptive load balancing may be implemented for a distributed system. An evaluation of criteria for creating a mapping for an identifier associated with requests may be performed. The created mapping may route requests to a distributed system to request handling nodes that cache request information for performing the requests. When requests are received, if an identifier determined to be associated with the request is mapped to request handling nodes, then the request may be sent to the identified request handling nodes instead of performing a load balancing technique to select a request handling node for the request.

20 Claims, 10 Drawing Sheets

ADAPTIVE LOAD BALANCING FOR DISTRIBUTED SYSTEMS

BACKGROUND

As distributed systems increase in size and complexity, the interactions to perform various operations in response to requests from client applications can increase the costs to perform such requests, both in terms of resource utilization and time. Load balancers are often implemented to optimize the distribution of work across distributed systems. In this way, load balancers can improve the performance of requests in distributed systems overall.

Figure 1:
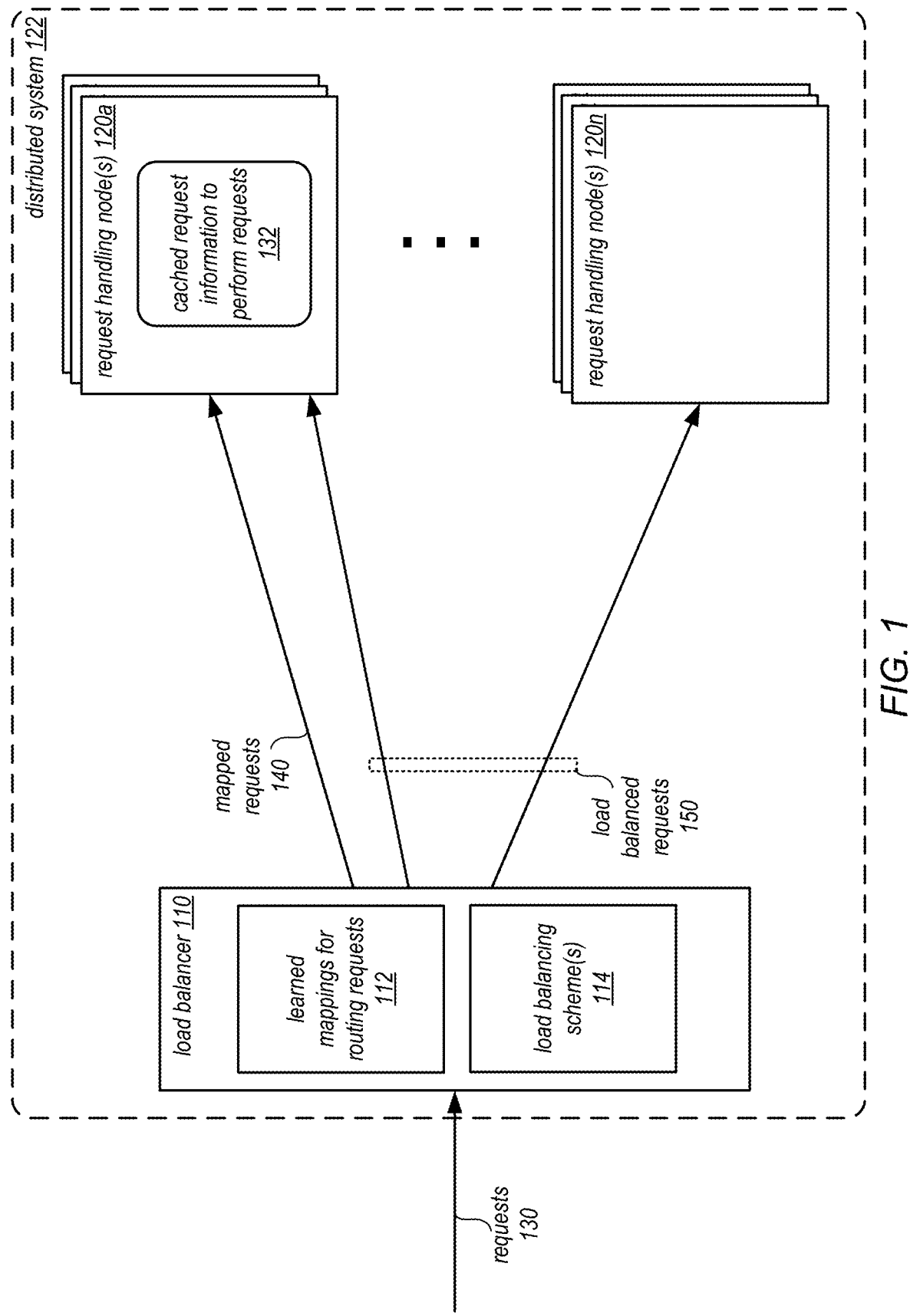
FIG. 1 is a logical block diagram illustrating adaptive load balancing for distributed systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for adaptive load balancing for distributed systems are described herein. Load balancing schemes may be implemented in various embodiments to balance distribution of work performed to handle different requests to ensure that no one component in a distributed system is over utilized. In some scenarios, balanced distribution of some requests can incur greater work overall than if a less-balanced distribution of requests were performed. For example, to perform some requests, various context or other request information to handle a request may have to be generated or otherwise obtained (e.g., information specific to the application or client performing the request). Instead of distributing requests according to a single approach, such as a load balancing scheme that distributes requests evenly (or nearly evenly), techniques for adaptive load balancing can be implemented to take advantage of scenarios in which request information can be beneficially cached at a request handling node in order to repeatedly handle requests that use the same request information. Techniques for adaptive load balancing can learn to recognize such beneficial scenarios in which increased performance for requests (and the distributed system overall) can be obtained when such requests are repeatedly routed to the same request handling nodes. For those requests which do not necessarily benefit from cached request information (e.g., infrequently performed requests), a load balancer can instead use a load balancing schemes to provide a balanced workload distribution.

FIG. 1 is a logical block diagram illustrating adaptive load balancing for distributed systems, according to some embodiments. Load balancer 110 may accept requests 130 bound for distributed system 122 in order to determine which from among various request handling nodes(s) 120a through 120n can perform the request. Load balancer 110 may be implemented on one or more computing devices, such as computing device 1000 discussed below with regard to FIG. 10. Similarly, request handling node(s) 120 may be implemented on one or more computing devices, such as computing device 1000 discussed below with regard to FIG. 10. Distributed system 122 may perform various services, functions, actions, or application, such as services in a provider network as discussed below with regard to FIG. 2, private applications, networks, services, or various other distributed applications, in some embodiments.

Load balancer 110 may forward requests 130 according to different techniques determined for the requests 130. For instance, in some embodiments, load balancer 110 may applied learned mappings for routing requests, as indicated at 112. As discussed in detail below with regard to FIGS. 3-9, learned mappings for routing requests 112 may include determining that requests associated with an identifier may be routed to certain request handling nodes that already cache performance information to perform the requests, such as cached request information to perform requests 132 at request handling nodes 120a. In this way, request handling node(s) 120a can perform the requests without having to generate and/or otherwise obtain the cached request information 132 before performing the request, saving distributed resources, reducing processing time, and improving the performance of client applications that utilize distributed system 122 to perform various operations.

Although it is possible using load balancing schemes may occasionally route requests to a request handling node 120 that stores cached performance information for that request, such performance benefits would occur much more infrequently and the performance benefits would not be intentionally obtained. Moreover, request handling node(s) 120 can implement different caching schemes to retain cached performance information if, for instance, a more deterministic distribution of requests is made to the request handling nodes (e.g., eviction policies for cached performance information may be modified to retain performance information longer as it may be more likely to be useful for handling subsequent requests).

Not all requests may achieve performance benefits when using a mapped request handling node, in some embodiments. For example, infrequently performed requests could, for instance obtain no real benefit from mappings as the time in between requests would likely cause any cached performance information to be evicted before being used again. Therefore, in various embodiments, various techniques for learning mappings for routing requests may evaluate criteria for determining whether to create a mapping, such as the example analyses discussed below with regard to FIGS. 8 and 9. Therefore, load balancer 110 may, in various embodiments, implement both load balancing scheme(s) 114 (e.g., round-robin, hash-based load balancing, etc.) and learned mappings for routing requests 112, in order to perform mapped requests 140 when it is efficient to maintain a mapping to request handling node(s) 120 and load balanced requests 150 when it is efficient to perform load balanced requests.

Please note that the previous description of a distributed system, including load balancer and request handling nodes, is a logical illustration and thus is not to be construed as limiting as to the implementation of a distributed system (or portions thereof), including a number or combination of hardware and/or software utilized to implement such features.

This specification begins with a general description of a provider network that implements multiple different services, including an Internet of Things (IoT) service, and/or other services, which may be the target of various service requests. The provider network may implement request routing for the network services that implements adaptive load balancing when forwarding requests to different request handlers implemented as part of the services. Then various examples of, including different components/modules, or arrangements of components/module that may be employed as part of implementing the provider network are discussed. A number of different methods and techniques to implement adaptive load balancing for distributed systems are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
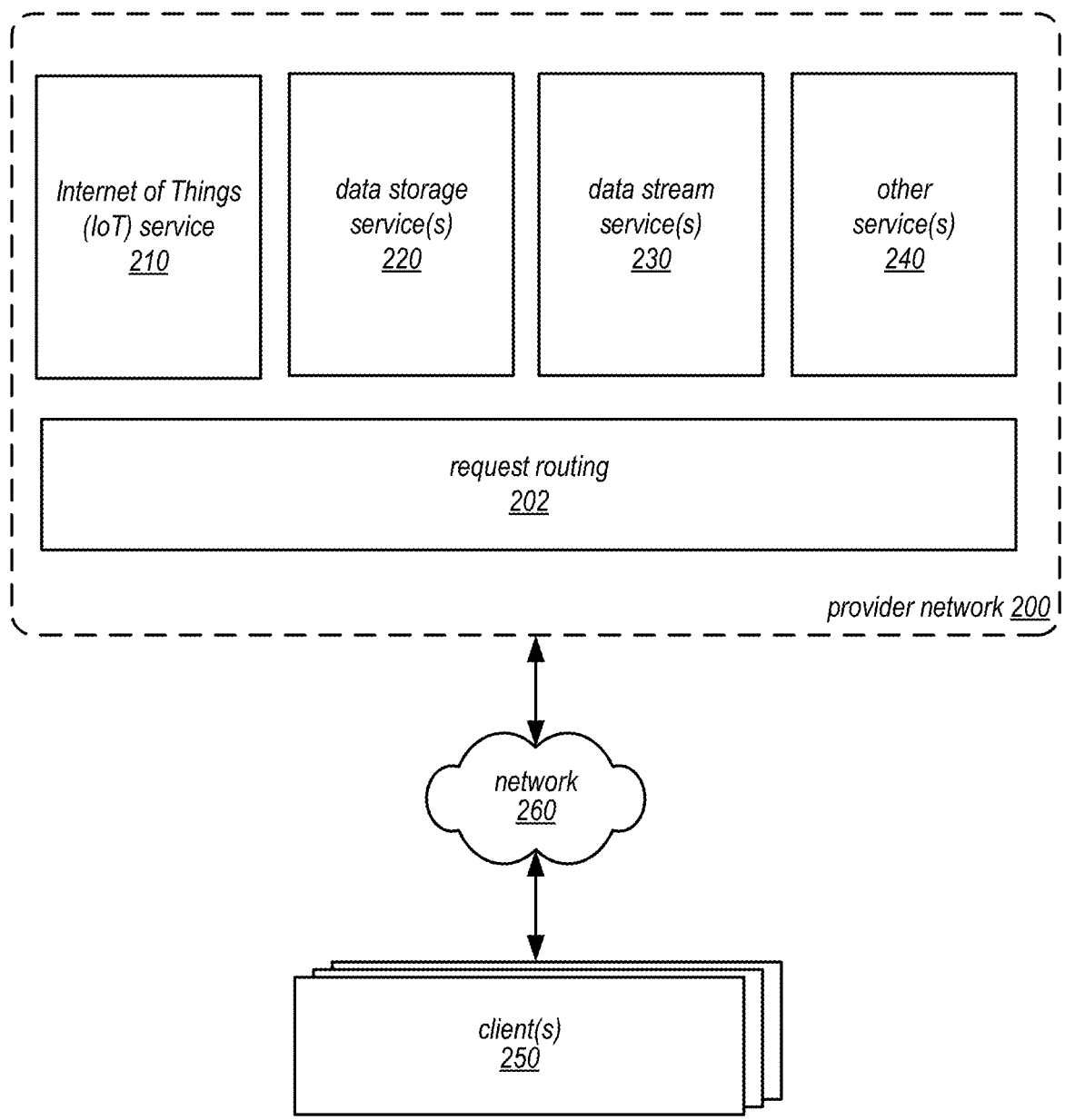
FIG. 2 illustrates an example provider network that implements services that which may implement adaptive load balancing for distributed systems, according to some embodiments.

FIG. 2 illustrates an example provider network that implements services that which may implement adaptive load balancing for distributed systems, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as IoT service 210, data storage service(s) 220, data stream service(s) 230, and/or any other type of network-based services 240 (which may include a virtual compute service and various other types of storage, processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of IoT service(s) 210) may be implemented by a particular node or may be distributed across several nodes. In some embodiments, a given node may implement the functionality of more than one service system component (e.g., more than one data store component).

IoT service 210 may deploy, coordinate and provide for various IoT based applications that utilize various remote devices (e.g., devices implemented on or as client(s) 250. For example, different client devices implemented in diverse locations, networks, and other scenarios that may collect, generate, and interoperate to perform different applications. IoT service 210 may coordinate the interaction of client devices with other services, such as data storage service(s) 220, data stream service(s) 230, or other service(s) 240 (e.g., artificial intelligence or other services that can integrate analysis to provide control or other information to client devices). IoT service 210 may provide security policies or controls that may be enforced in order to ensure data privacy, prevent malicious behavior, and satisfy various industry or governmental regulatory systems. Because IoT service 210 is implemented as part of a provider network, IoT service 210 can provide scalability, availability, durability, and other benefits of a provider network (e.g., cloud service benefits) to provide client applications with the ability to right-size resources to meet demand.

As discussed above with regard to FIG. 1, and below with regard to FIGS. 3-9, various requests may be received for services and dispatched to one or multiple request handling nodes which may be implemented for various services, including IoT service 210, and for which adaptive load balancing may be implemented. For example, one feature of IoT service(s) 210 that clients may take advantage of is control services. In various embodiments, control services of IoT service 210 may coordinate the deployment of IoT applications across devices and networks, to provide secure interactions between different client devices. Control service of IoT service 210 may integrate with or connect to artificial intelligence and other data analysis techniques or services for training and applying machine learning models to add or improve application features of client devices. In some embodiments, control services of IoT service 210 may monitor and/or audit client device applications to enforce or review security policies or other controls. Control service of IoT service 210 may provide for remote management of client devices, for IoT application updates, changes, or other tasks or operations to be performed without physical access to a client device.

IoT service 210 may also implement data analysis, in some embodiments, to which various may requests may be directed, with load balancing for the requests handled according to the various techniques described herein. Data analysis of IoT service 210 may include various analytic tools, such as tools to handle structured and unstructured data. Data analysis of IoT service 210 may, for instance, provide features to filter and transform data streams from client devices into other formats susceptible to better analysis, such as for creating time series data to be stored in a time series database, machine learning data to update or train a machine learning model, or various other analysis (e.g., supporting queries or other requests to obtain data from within a data stream (or group of data streams). In some embodiments, data analysis of IoT service 210 may be a fully managed feature that scales up or down to handle different loads for receiving, filtering, transforming, and/or storing data streams from client devices. In some embodiments, data analysis of IoT service 210 may monitor data streams to detect and respond to events.

IoT service 210 may implement deployment, in various embodiments. For example, deployment of IoT service 210 may provide access to configuring and deploying software applications and/or operating systems that support and/or implement IoT applications at the edge of a provider network in a client network. For example, deployment of IoT service 210 may provide an operating system for microcontrollers or other low-power edge devices that implements network connectivity and other features that support interactions amongst, for instance, other devices in client networks, without straining the limited processing resources often available in such devices. In various embodiments, deployment of IoT service 210 may provide a local execution environment, such as a local execution environment or an edge device.

In various embodiments, provider network 200 may implement other services which may be the target or destination of requests, which may be adaptively load balanced. For example, data storage service(s) 220 may implement different types of data stores for storing, accessing, and managing data on behalf of clients as a network-based service that enables clients to operate a data storage system in a cloud or network computing environment, in some embodiments. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 220 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 220 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 220 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 220 may be a data warehouse service that utilizes a centralized data store implemented as part of another data storage service 220. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Another service in provider network 200 for which adaptive load balancing may be implemented is data stream service(s) 230. Data stream service(s) 230 may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments. Some clients of the stream management system may develop applications that directly invoke the stream management programmatic interfaces in various embodiments. In at least some embodiments, however, in addition to the stream management interfaces, a higher-level abstraction or application-level processing framework may be provided for customers, which may simplify various aspects of stream processing for those clients that do not wish to develop applications using the lower-level stream management functions supported by the stream management system. Such a framework may provide its own programmatic interfaces (built, for example, on top of the stream management system interfaces), enabling customers to focus more on the business logic to be implemented using stream records than on lower-level stream management operations. The higher-level framework may be implemented as part of the stream management system to provide fully managed data stream.

For example, data stream service(s) 230 may implement a data ingestion system configured to obtain data records of a particular data stream from data producers (e.g., by operating one or multiple ingestion nodes for a data stream). In some embodiments, data records of a stream may be obtained according to a scheme for partitioning the data stream. The partitioning scheme may be selected by a client of data stream service(s) 230 for a data stream such that data records are received from data producer(s) indicating the particular partition to which the data record belongs. However, in some embodiments, a data stream may be fully managed by data stream service(s) 230 and data producer(s) may send data records without any direction for partitioning. Instead, the data ingestion system may assign data records to route the data records to identified partition. Once ingested, stream management service may store obtained data records (e.g., on corresponding storage nodes provisioned for the data stream). Such storage nodes may record, save, store or otherwise persist the data records on any of various types of storage devices (which may be performed in accordance with a persistence policy for the data stream).

In order to retrieve data from the data stream, data stream service(s) 230 may provide a retrieval system (e.g., implementing retrieval nodes) that may access the stored data records of the data stream. In some embodiments, data retrieval may be performed in response to request from consumers (e.g., stream processing nodes that perform processing on data stream data).

Data stream service(s) 230 may provide an interface that supports one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by data stream service(s) 230 to utilize requests, sending a "putRecord" request to data stream service(s) 230 via the interface. Similarly, data consumer(s) may be configured to access data stream service(s) 230 via the interface and utilize the client library provided by data stream service(s) 230 to "getNextRecords" when executing an application to retrieve the next data records to be processed in the data stream.

Other service(s) 240 may also include services that are targets of requests, in some embodiments. For example, other service(s) 240 may include ay be various types of data processing services to perform different functions (e.g., query or other processing engines to perform functions such as anomaly detection, machine learning, data lookup, or any other type of data processing operation). For example, in at least some embodiments, data processing services may include a map reduce service that creates clusters of processing nodes that implement map reduce functionality over data stored in one of data storage services 220. Various other distributed processing architectures and techniques may be implemented by data processing services (e.g., grid computing, sharding, distributed hashing, etc.).

Provider network 200 may implement request routing 202 in order to dispatch, forward, route, or otherwise send requests to the appropriate resources for handling the requests. In at least some embodiments, request routing 202 may respectively implemented as part of each service (e.g., as part of IoT service 201, data storage service(s) 220, data stream service(s) 230, and/or other service(s) 240). Request routing 202 may include one or multiple load balancers which may implement the various adaptive request routing techniques discussed below with regard to FIGS. 3-9, in various embodiments.

Generally speaking, clients 250 of a provider network may access provider network 200 via network 260. Such clients may convey network-based services requests (e.g., requests to send data from a data stream via network 260), in some embodiments. In various embodiments, network 260 may encompass any suitable combination of networking hardware and protocols necessary to establish network-based-based communications between clients and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network 200.

Client(s) 250 may be various computing devices, such as computing system 1000 discussed below with regard to FIG. 10. In some embodiments, client(s) 250 may be various sensors, appliances, equipment, or other devices that may implement a microcontroller or other processing components that can capture, generate, and send requests to other client devices directly to provider network 200.

Figure 3:
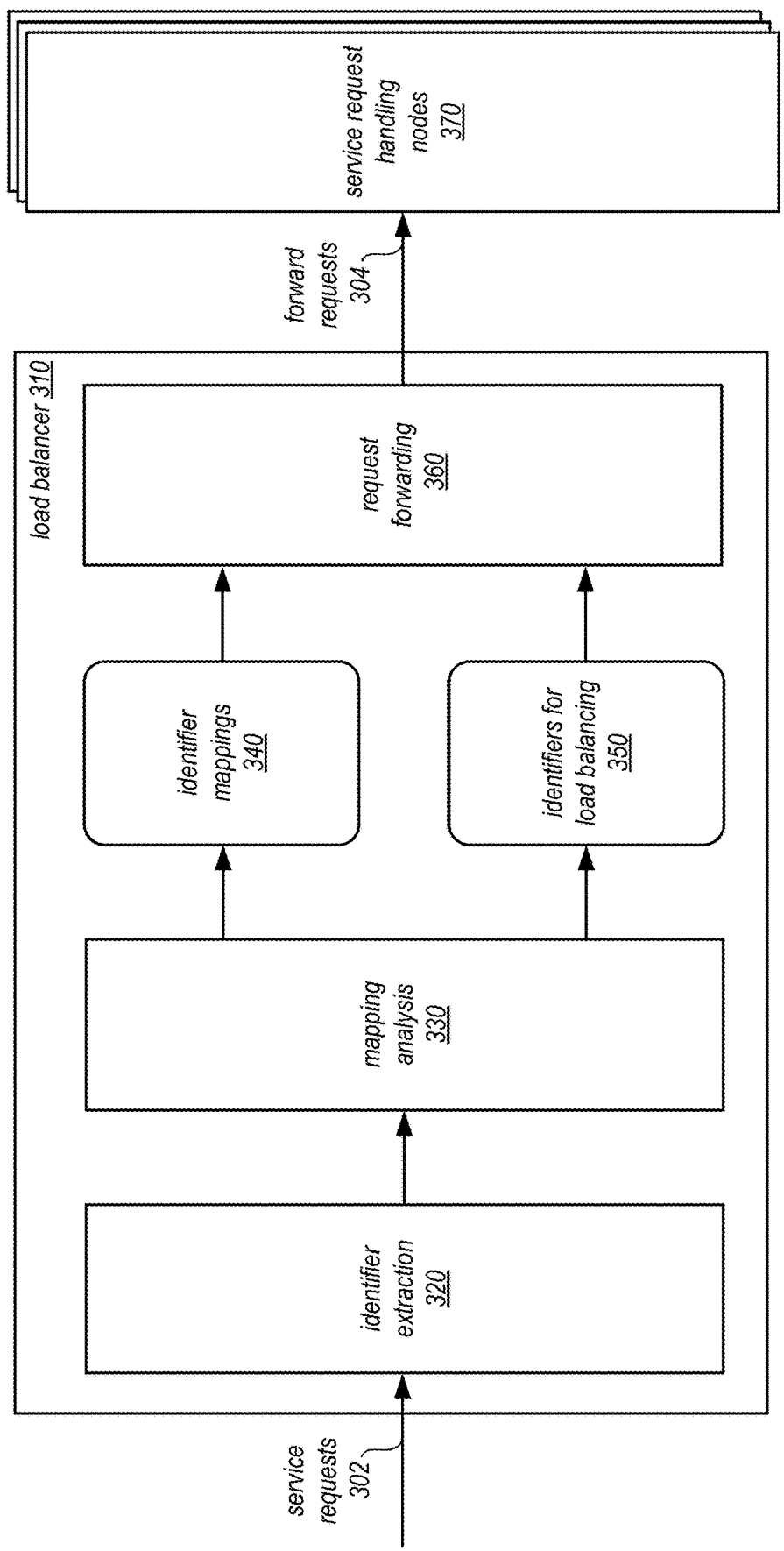
FIG. 3 illustrates a logical block diagram for interactions between a load balancer and request handling nodes, according to some embodiments.

As noted above, load balancers may be implemented as part of request routing 202 in order to dispatch requests to the resources within services of provider network 200. FIG. 3 illustrates a logical block diagram for interactions between a load balancer and request handling nodes, according to some embodiments. Load balancer 310 may receive service requests 302 from clients 250 in FIG. 2 (or from clients internal to provider network 200, as implemented by another service within provider network 200). Load balancer 310 may implement identifier extraction 320 to determine an identifier for a service request. For example, an identifier may be determined from a header, parameter, token, source, or other information specified by or associated with a service request 302.

Figure 4:
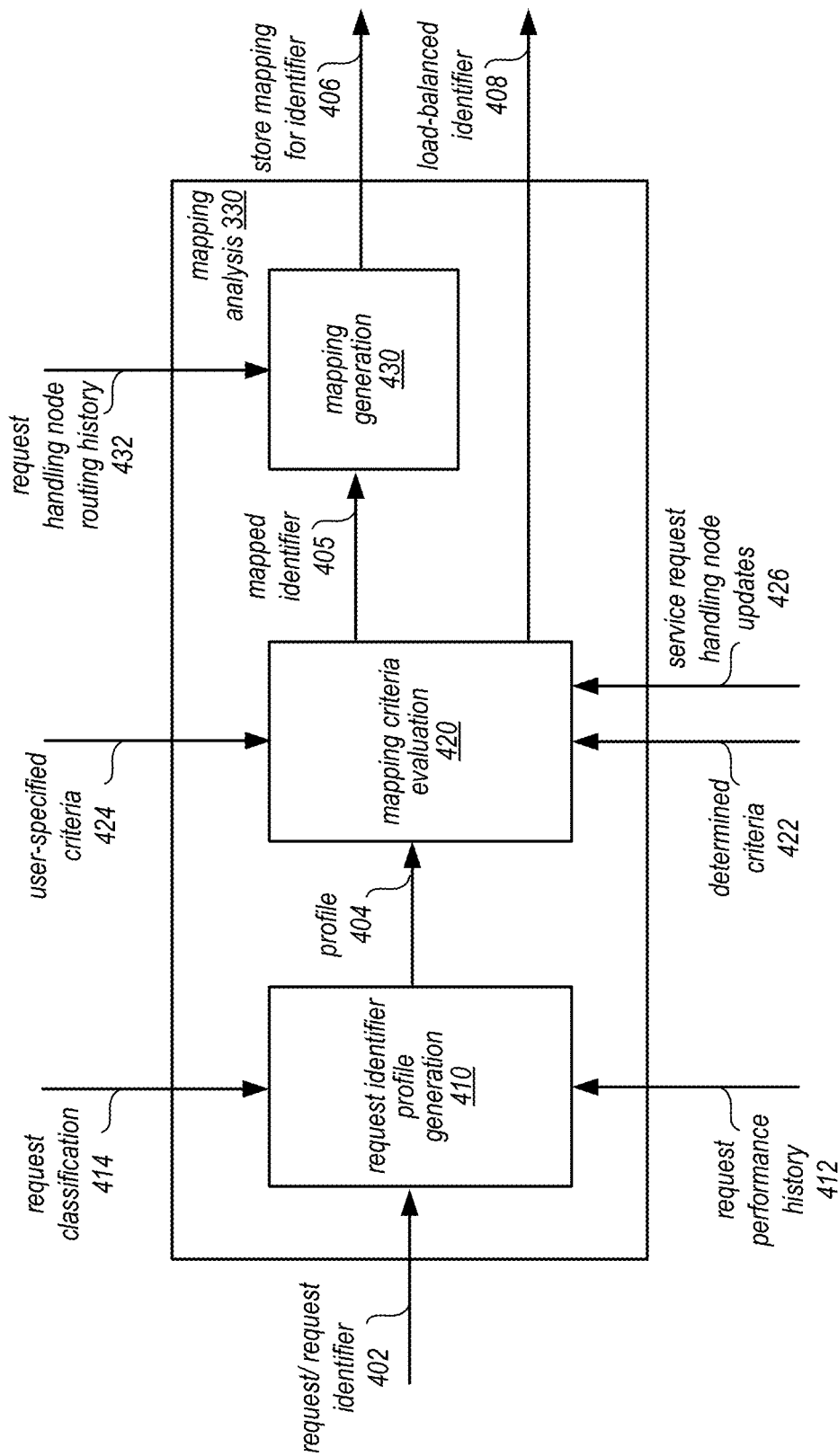
FIG. 4 illustrates a logical block diagram illustrating mapping analysis for adaptive load balancing of requests, according to some embodiments.

Load balancer 310 may implement mapping analysis 330, discussed in detail below with regard to FIG. 4, to determine whether a request is already mapped, should be mapped, or should not be mapped to specific service request handling nodes, such as service request handling node(s) 370. Mapping analysis 330 may store created mappings as part of identifier mappings 340, in some embodiments. In some embodiments, mapping analysis 330 may store identifiers for load balancing 350 (e.g., identifiers for which mapping is not performed to avoid re-analyzing the identifier at a later time). In some embodiments, mapping analysis 330 may be performed in the background or otherwise outside of path for handling a particular service request. Instead, in such embodiments, mapping analysis 330 may determine for one or more types of requests under consideration (e.g., requests associated with a particular identifier) that such requests would be beneficially mapped instead of using a load balancing scheme).

Load balancer 310 may implement request forwarding 360 to forward requests 304 to the determined service request handling nodes 370 (which may be implemented as part of various ones of the services of provider network 200 discussed above) according to the load balancing scheme or identified mappings respectively determined for service requests 302. For instance, request forwarding 360 may transmit the request to a network address, endpoint, or path for an identified service request handling node 370.

Mapping analysis for learning and adapting load balancing for requests can be implemented using different types of modeling, analysis, and criteria, in various embodiments. FIG. 4 illustrates a logical block diagram illustrating mapping analysis for adaptive load balancing of requests, according to some embodiments. Mapping analysis 330 may implement request profile generation 410, in various embodiments. Request profile generation 410 may determine a profile or other representation of a request for a particular identifier associated with that request (e.g., a user, account, or tenant identifier). Profile generation 410 may rely upon various types of profile representation (e.g., feature vectors, score(s), or costs, among others) to determine how to represent the profile of a request and identifier. In at least some embodiments, request performance history 412, which may be collected by request handling nodes (or other service components) may be provided to incorporate as part of request profile generation 410 and may include resource utilization, latency/time processing, rates, patterns, or other indications request frequency, among other information. In some embodiments, request profile generation may determine a prediction or forecast of request frequency as part of a profile. Request classification 414 may be provided or used for request profile generation. For example, request classification 414 may indicate a data classification, quality of service, or other indication of performance requirement, which may be met or satisfied by generating mappings for routing requests associated with an identifier.

Mapping analysis 330 may implement mapping criteria evaluation 420 which may accept a profile 404 for an identifier in order to determine whether a mapping should be generated for an identifier for requests, in some embodiments. For example, various criteria (e.g., the thresholds discussed below with regard to FIGS. 8 and 9) can be evaluated with respect to a profile. Criteria may be obtained in various ways. User-specified criteria 424 may be implemented, in some embodiments, in order to allow for user-specified prioritization or other controls to be implemented as part of load balancing (e.g., prioritized types of requests). Determined criteria 422 may be system determined or specified criteria based on the feedback of different services (e.g., received from request handling nodes) or updated criteria in response to changes in capacity or availability of services, such as in response to outages of request handling nodes. Mapping criteria evaluation 420 may select the appropriate criteria for a request identifier (e.g., based on the profile and other criteria for the destination of the request, such as service-specific criteria).

In some embodiments, mapping criteria evaluation 420 may adapt to changes in the numbers or availability of request handling nodes to perform requests. For example, as indicated at 426, service request handling node updates may be received to identify changes in the numbers of nodes or availability of nodes. In this way, mapping criteria evaluation can determine if a node that previously cached request information is still available, and thus can be mapped, and/or if a sharding or other load balancing scheme for distributing requests should be updated in order to account for more (or less) request handling nodes).

In various embodiments, mapping criteria evaluation may provide mapped identifiers 405 or load-balanced identifiers 408. For mapped identifiers 405, mapping generation 430 may create a mapping for the identifier based on request handling node routing history, to create a mapping that routes requests associated with the identifier to a request handling node known to have cached performance information for that request. Mapping generation 430 may then store the mapping for the identifier, as indicated at 406.

Figure 5:
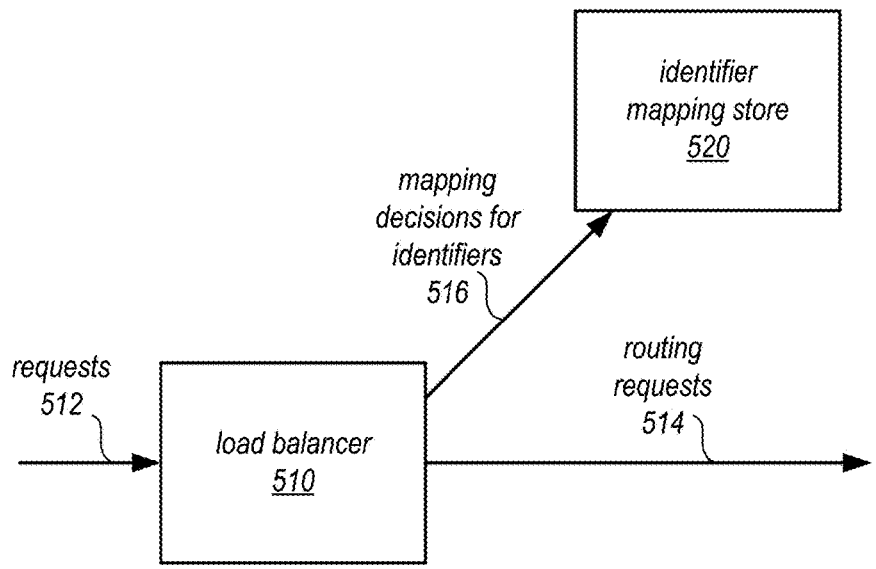
FIG. 5 illustrates a logical block diagram of warming a cache mapping decisions for a new load balancer, according to some embodiments.
Figure 5:
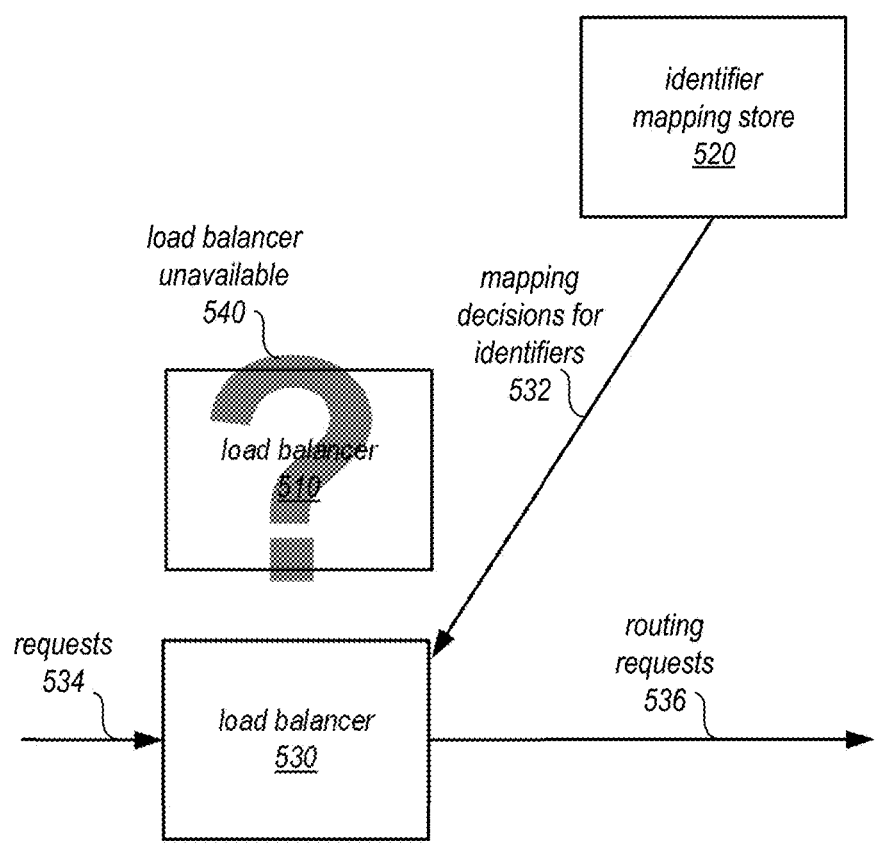

As mapping decisions can increase the performance of requests handled by a load balancer, increasing the visibility into mapping decisions, such as sharing the mapping decisions with new or additional load balancers can quickly provide the performance benefits of adaptive load balancer across multiple load balancers (or prevent the loss of mapping decisions in the event of load balancer failure. FIG. 5 illustrates a logical block diagram of warming a cache mapping decisions for a new load balancer, according to some embodiments. As illustrated in scene 502, load balancer 510 may receive requests 512 for routing. As discussed above with regard to FIGS. 1, 3-4, and 6-9 below, load balancer 510 may determine and utilize mapping decisions to route requests 514 for identifiers determined for requests 512. In addition to locally maintaining mapping decisions (e.g., in a memory local to a load balancer), load balancer 510 may record, push, or otherwise store mapping decisions for identifiers 516 to a separate identifier mapping store 520. Identifier mapping store 520 may be a distributed data storage system, or single storage device, volume, or system, in some embodiments. Identifier mapping store 520 may be persistent storage whereas mapping storage in load balancer 510 may be volatile storage, in some embodiments.

As indicated in scene 504, load balancer 510 may become unavailable, as indicated at 540 (e.g., due to load balancer failure, network failure, or other interruption of access to load balancer 510). In order to quickly resume request routing, a new load balancer 530 may obtain the mapping decisions for identifiers 532 from identifier mapping store 520. In this way, load balancer 530 can start with a warmed set of mappings for routing requests, without waiting to make determinations about whether a request should be mapped (or not). Then, as illustrated in 504, requests 534 can be routed by load balancer 530 to make routing decisions using the mappings for determined identifiers in order to route requests, as indicated at 536.

Figure 6:
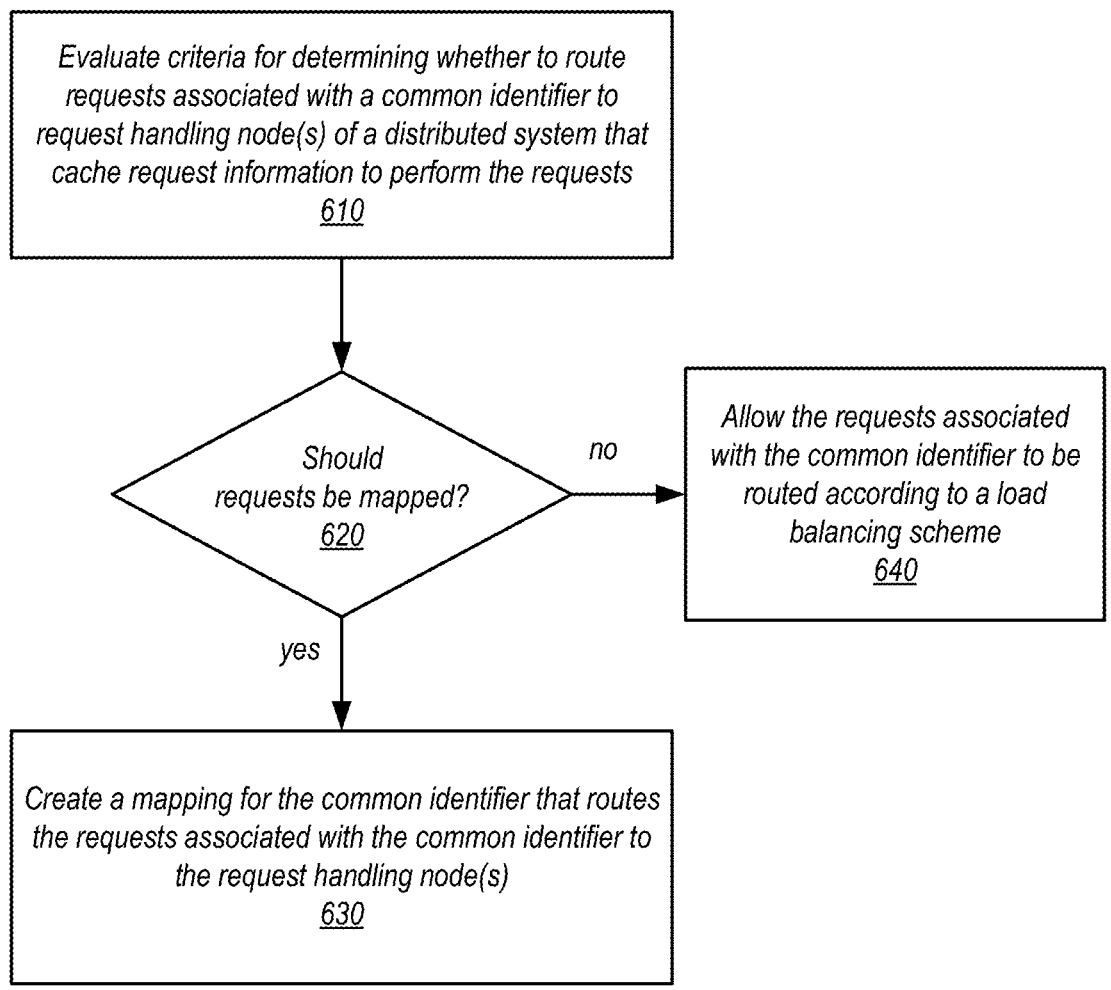
FIG. 6 illustrates a high-level flowchart of various methods and techniques to implement creating mappings for routing requests for adaptive load balancing for distributed systems, according to some embodiments.

Although FIGS. 2-5 have been described and illustrated in the context of a provider network implementing various services for performing network-based requests, the various components illustrated and described in FIGS. 2-5 may be easily applied to other distributed systems (e.g., private services, systems, or networks). As such, FIGS. 2-5 are not intended to be limiting as to other embodiments of adaptive load balancing for distributed systems. FIG. 6 illustrates a high-level flowchart of various methods and techniques to implement creating mappings for routing requests for adaptive load balancing for distributed systems, according to some embodiments. Various different systems and devices may implement the various methods and techniques described below, either singly or working together. For example, a request routing layer of a service of a provider network as described above may use some or all of the various methods. Therefore, the above examples and or any other systems or devices referenced as performing the illustrated method, are not intended to be limiting as to other different components, modules, systems, or devices.

As indicated at 610, criteria may be evaluated for determining whether to route requests associated with a common identifier to request handling node(s) of a distributed system that cache request information to perform the requests, in some embodiments. For example, criteria may be determined from various sources (e.g., request balancing nodes, client applications, or pre-defined threshold or other values). Performance information for the requests may be collected, tracked, or otherwise obtained in order to evaluate the criteria for the common identifier. For instance, all requests associated with a user account identifier may be tracked including the frequency. In some embodiments, the identifier may be associated with requests in addition to one of multiple request types. For instance, information for request type X for user account Y may be considered for mapping and evaluated according to the criteria (e.g., does the frequency of such requests exceed a minimum frequency threshold). Thus, in some embodiments, requests of one type associated with the common identifier may not be mapped even though requests of another type associated with the common identifier may be mapped.

As indicated at 620, the evaluation of the criteria may determine whether requests should be mapped. For those requests that should be mapped, a mapping may be created for the common identifier that routes the requests associated with the common identifier to the request handling node(s), as indicated at 630, in some embodiments. For example, an index, or other data structure may be implemented to store identifiers and pointers to a network address, path, lookup value, or other information to identify which request handling node should receive a request associated with the common identifier.

As indicated at 640, if the requests should not be mapped, then the requests associated with the common identifier may be allowed to be routed according to a load balancing scheme, in some embodiments. For instance, such requests may be distributed according to round-robin, hash-based distributions (or other sharding schemes) and/or other load balancing schemes, in some embodiments. In some embodiments, such requests may be added to a load-balancing only list, or in other embodiments, such requests may be evaluated again for mapping at a later time (e.g., as such requests may satisfy the criteria at the later time).

Figure 7:
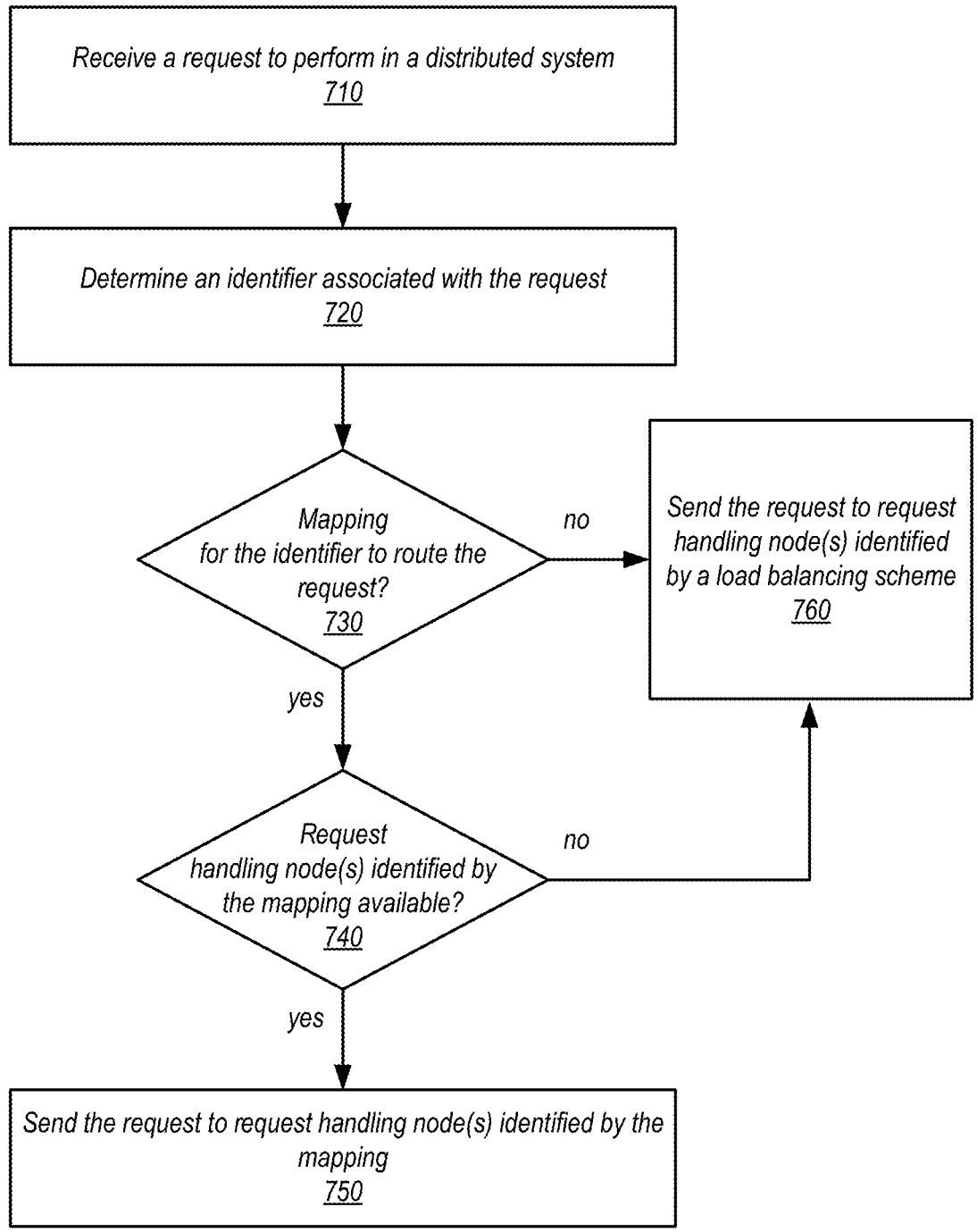
FIG. 7 illustrates a high-level flowchart of various methods and techniques to implement routing requests when adaptive load balancing is enabled, according to some embodiments.

FIG. 7 illustrates a high-level flowchart of various methods and techniques to implement routing requests when adaptive load balancing is enabled, according to some embodiments. As indicated at 710, a request may be received to perform in a distributed system, in some embodiments. As indicated at 720, an identifier associated with the request may be determined, in some embodiments. For example, a header or other portion of a request (e.g., a portion of a network packet) may be read, parsed, or otherwise examined. In some embodiments, a source of the request may indicate (or be) the common identifier. In some embodiments, a type of request may also be determined (e.g., according to the type of function or operation invoked, such as may be specified using a particular Application Programming Interface (API)).

As indicated at 730, a determination may be made as to whether a mapping for the identifier exists to route the request, in some embodiments. For example, a lookup operation for an index or other data structure that stores identifiers for requests may be evaluated to see if an entry exists. In some embodiments, a request type may also be considered. For instance, a mapping may be maintained for a request with a common identifier and specified request type. In some embodiments, an identifier may be a constructed value that is based off of multiple values (e.g., an identifier may be a concatenation of user account and request type, or may be generated from them). If not, then as indicated at 760, the request may be send to request handling node(s) identified by a load balancing scheme, in some embodiments.

As indicated at 740, if a mapping for the identifier to route the request is available, a determination may be made as to whether the request handling node(s) identified by the mapping are available to receive the request, in some embodiments. For instance, availability information may be provided to a load balancer by request handling nodes themselves, by a fleet or other management component for request handling nodes, or by another request handling node which may have discovered the unavailability of the request handling node. If not, then as indicated at 760, the request may be sent to request handling node(s) identified by a load balancing scheme, in some embodiments. If the request handling node(s) are available, then as indicated at 750, the request may be sent to the request handling node(s) identified by the mapping, in some embodiments.

Figure 8:
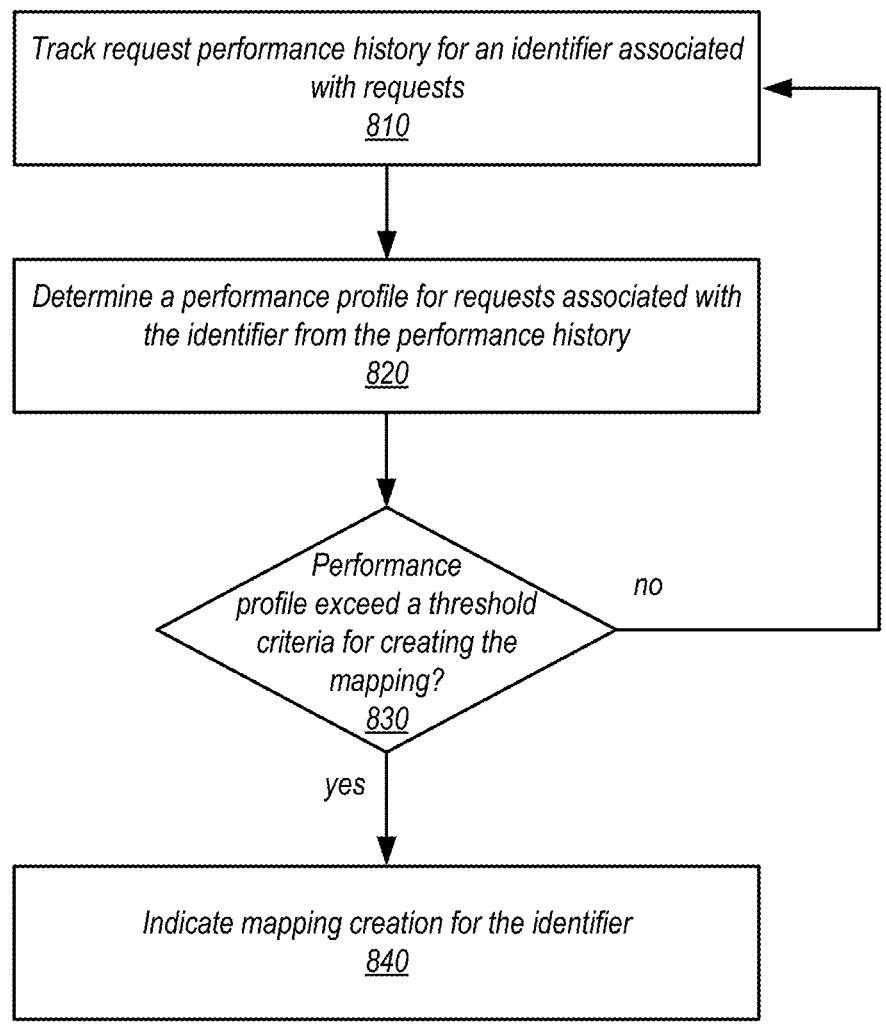
FIG. 8 illustrates a high-level flowchart of various methods and techniques to implement determining performance profiles for adding mappings for routing requests, according to some embodiments.

In some embodiments, mapping analysis may rely upon an understanding of the history or behavior of a request for a common identifier. In some embodiments, performance profiles may provide the history or behavior of a request for a common identifier. FIG. 8 illustrates a high-level flowchart of various methods and techniques to implement determining performance profiles for adding mappings for routing requests, according to some embodiments. As indicated at 810, request performance history for an identifier associated with requests may be tracked, in some embodiments. For example, request handling nodes may record various performance aspects of requests, such as resource utilization with and without request information caching, time to complete, or other characteristics of performing requests associated with a common identifier, in some embodiments. This information may be returned or otherwise provided to a load balancer.

As indicated at 820, a performance profile for requests associated with the identifier may be determined from the performance history, in some embodiments. For example, a profile may include one or multiple performance characteristics, such as frequency, resource cost, time to complete, benefit of cached request information, among others. The performance profile may, in some embodiments, be represented or transformed into a score that weights various ones of the features to provide a value that can be evaluated using mathematical operators, as discussed below.

As indicated at 830, if the performance profile exceeds a threshold criteria for creating the mapping, then a mapping creation may be indicated for the identifier, as indicated at 840, in some embodiments. For example, the frequency value of requests may be compared with the threshold to determine whether to create a mapping if the frequency is above a minimum frequency. In some embodiments that utilize a score or other combination of features of the profile, then the score value may need to be less, equal to, or more than a threshold value. If not, then monitoring and evaluation of performance for requests associated with the identifier may continue.

Figure 9:
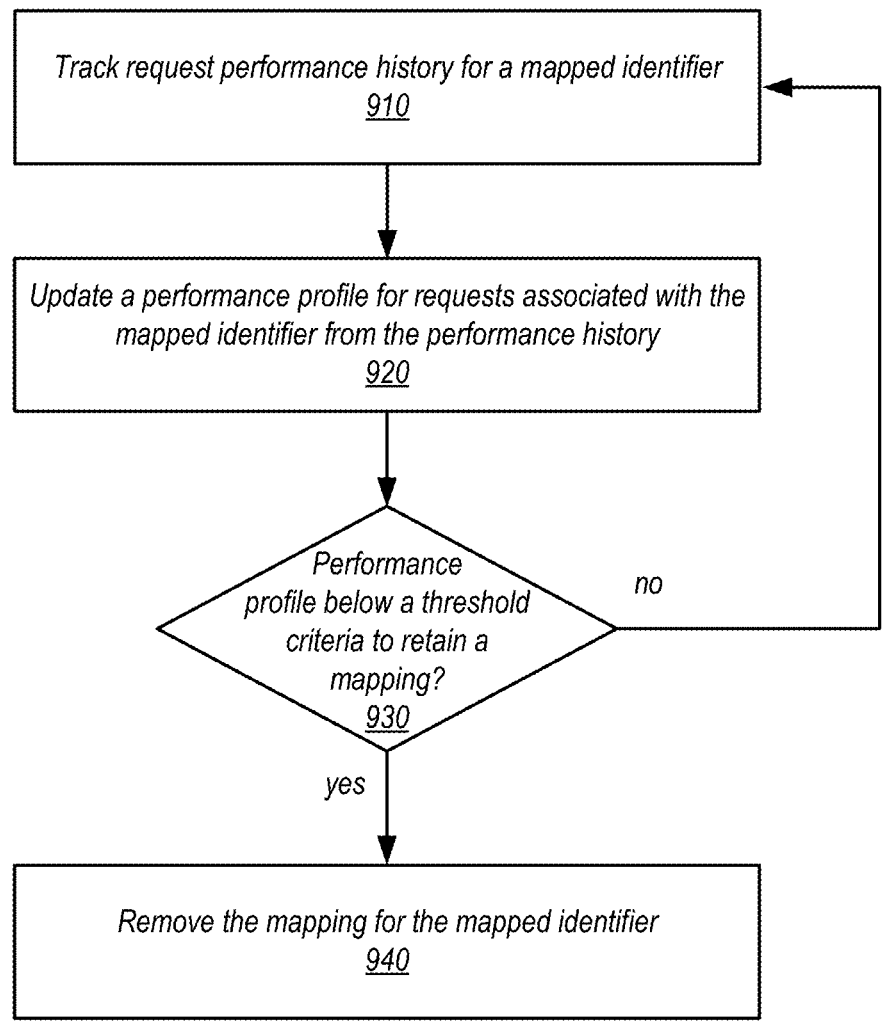
FIG. 9 illustrates a high-level flowchart of various methods and techniques to implement determining performance profiles for removing mappings for routing requests, according to some embodiments.

While maintaining mappings to request handling nodes can ensure that requests with potential performance benefits from cached request information may be efficiently handled, which requests may take advantage of this benefit can change. The frequency of requests can, for instance, change and therefore the caching benefit one request for one identifier receive may no longer be as great as another request for another identifier (which may or may not have room to be mapped), in some embodiments. FIG. 9 illustrates a high-level flowchart of various methods and techniques to implement determining performance profiles for removing mappings for routing requests, according to some embodiments. As indicated at 910, request performance history for a mapped identifier associated with requests may be tracked, in some embodiments. As discussed above with regard to FIG. 8, request handling nodes may record various performance aspect of requests, such as resource utilization with and without request information caching, time to complete, or other characteristics of performing requests associated with a common identifier, in some embodiments.

As indicated at 920, a performance profile for requests associated with the mapped identifier may be updated from the performance history, in some embodiments. For instance, the various features or characteristics of the profile may be altered to account for the additional performance information. In some embodiments, a score may be adjusted based on the updated features.

As indicated at 930, if the performance profile is below a threshold criteria for retaining the mapping, then the mapping may be removed for the identifier, as indicated at 940, in some embodiments. For example, if the score falls below a threshold value, then the mapping may not be retained, in some embodiments. In some embodiments, if a feature or characteristic, such as frequency value or time to obtain request information falls below the threshold value, then the mapping not be retained. If not, then monitoring and evaluation of performance for requests associated with the mapped identifier may continue.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of adaptive load balancing for distributed systems as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions to implement adaptive load balancing for distributed systems and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
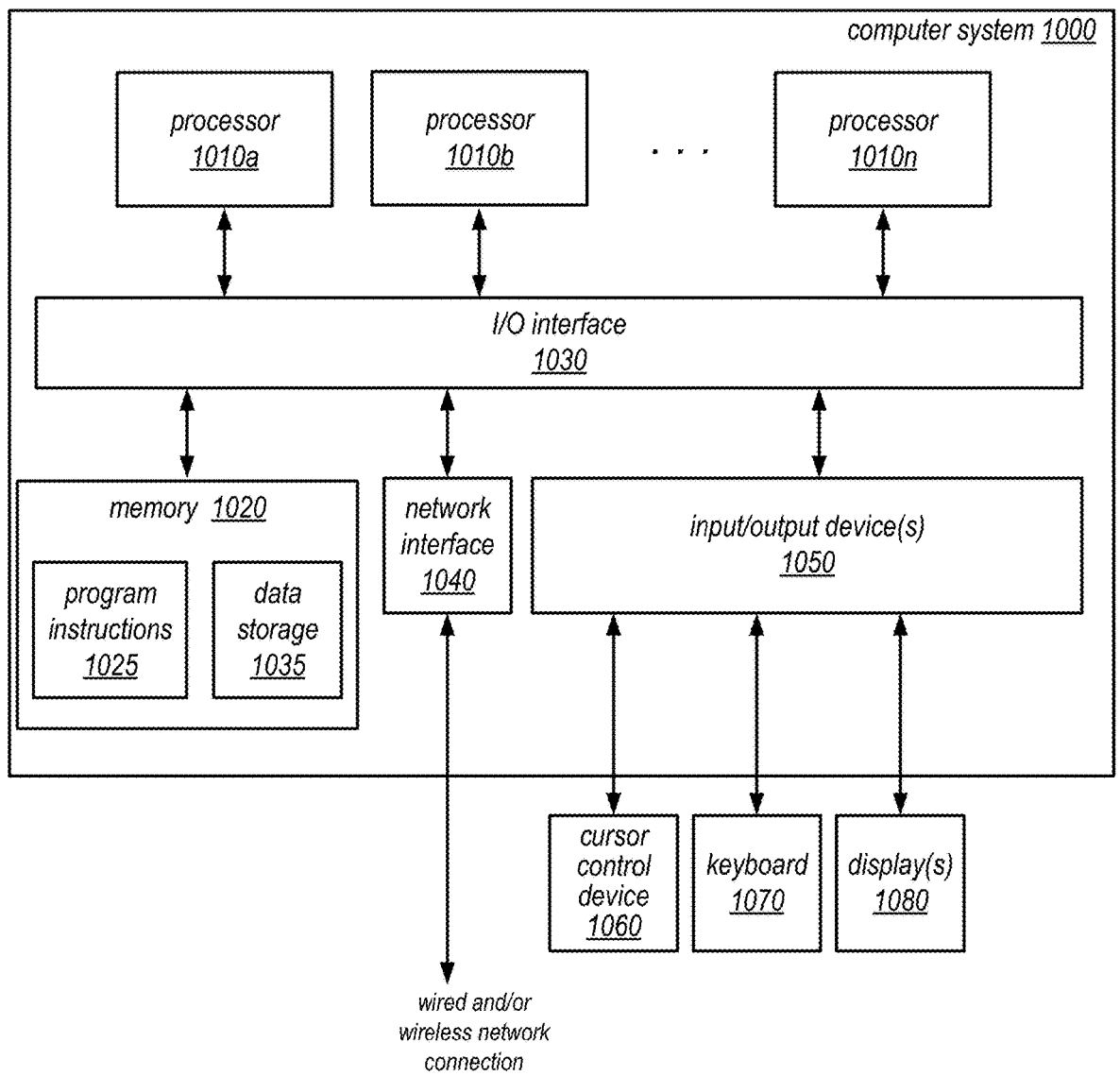
FIG. 10 illustrates an example system to implement the various methods, techniques, and systems described herein, according to some embodiments.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL))

corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A distributed system, comprising:
a plurality of request handling nodes, respectively comprising at least one processor and a memory, that perform requests received by the distributed system and cache request information obtained to perform the requests; and
a load balancer, respectively comprising another processor and another memory, that is configured to:
for a common identifier associated with requests to the distributed system:
evaluate a performance profile for requests associated with the common identifier with respect to one or more criteria to make a determination to route requests to one or more of the request handling nodes that cache request information to perform the requests associated with the common identifier;
store a mapping for the common identifier that is utilized to route the requests associated with the common identifier to the one or more request handling nodes, wherein the one or more request handling nodes are identified by the mapping for the common identifier;
receive a request to be performed by the distributed system;
determine that the request to be performed by the distributed system is associated with the common identifier; and
forward the request to the one or more request handling nodes.

2. The system of claim 1, wherein the load balancer is configured to perform the evaluation of the performance profile in response to the receipt of the request.

3. The system of claim 1, wherein the load balancer is further configured to:
track request performance history for the common identifier;
update the performance profile for the requests associate with the common identifier;
determine that the updated performance profile is below a threshold criteria to retain the mapping; and
remove the mapping for the common identifier.

4. The system of claim 1, wherein the distributed system is a service implemented as part of a provider network and wherein the common identifier is an account identifier for the provider network.

5. A method, comprising:
evaluating, by a load balancer, one or more criteria for determining whether to route requests to one or more request handling nodes of a distributed system that cache request information to perform the requests, wherein the requests are associated with a common identifier, wherein the evaluating the one or more criteria comprises determining whether a performance profile for the requests associated with the common identifier exceeds a threshold criteria for creating a mapping for the common identifier;
determining to route the requests associated with the common identifier to the one or more request handling nodes according to the evaluation of the one or more criteria;
responsive to the determining to route the requests, creating, by the load balancer, the mapping for the common identifier that is utilized to route the requests associated with the common identifier to the one or more request handling nodes;
receiving, by the load balancer, a request;
determining, by the load balancer, that the request is associated with the common identifier; and
sending, by the load balancer, the request to the one or more request handling nodes identified according to the mapping for the common identifier.

6. The method of claim 5, further comprising:
receiving, by the load balancer, another request;
determining, by the load balancer, that the other request is associated with a different identifier;
determining, by the load balancer, that there is no mapping created for the different identifier; and
sending, by the load balancer, the other request to one of the request handling nodes selected according to a load balancing scheme.

7. The method of claim 5, further comprising:
receiving, by the load balancer, another request;
determining, by the load balancer, that the other request is associated with a different identifier;
determining, by the load balancer, that there is a mapping created for the different identifier that maps the different identifier to one of the request handling nodes;
determining that the one request handling node is not available to accept the other request; and
sending, by the load balancer, the other request to a different one of the request handling nodes selected according to a load balancing scheme.

8. The method of claim 5, further comprising:
evaluating, by the load balancer, the one or more criteria for determining whether to route requests associated with a different common identifier to another one or more request handling nodes of the distributed system;
responsive to determining not to route the requests associated with the different common identifier to the other one or more request handling nodes according to the evaluation of the one or more criteria, allowing, by the load balancer, the requests associated with the different common identifier to be routed according to a load balancing scheme.

9. The method of claim 5,
wherein the method further comprises:
tracking, by the load balancer, request performance history for the common identifier;

determining, by the load balancer, the performance profile for the requests associated with the common identifier based, at least in part, on the request performance history.

10. The method of claim 5, further comprising:

tracking, by the load balancer, request performance history for the common identifier;

updating, by the load balancer, the performance profile for the requests associated with the common identifier;

determining, by the load balancer, that the updated performance profile is below a threshold criteria to retain the mapping; and removing, by the load balancer, the mapping for the common identifier.

11. The method of claim 5, wherein one of the one or more criteria is a user-specified mapping criteria.

12. The method of claim 5, wherein one of the one or more criteria is a request to create the mapping for the common identifier received from one of the one or more request handling nodes.

13. The method of claim 5, further comprising:

obtaining, by another load balancer, the mapping for the common identifier that routes the requests associated with the common identifier to the one or more request handling nodes; and receiving, by the other load balancer, another request determined to be associated with the common identifier; and sending, by the other load balancer, the other request to the one or more request handling nodes identified according to the mapping for the common identifier.

14. One or more non-transitory, computer-readable storage media, storing program instructions that when executed on or across one or more computing devices cause the one or more computing devices to implement a load balancer that implements:

evaluating one or more criteria for determining whether to route requests to one or more request handling nodes of a distributed system that cache request information to perform the requests, wherein the requests are associated with a common identifier, wherein the evaluating the one or more criteria comprises determining whether a performance profile associated with the common identifier exceeds a threshold criteria for creating a mapping for the common identifier;

determining to route the requests associated with the common identifier to the one or more request handling nodes according to the evaluation of the one or more criteria;

responsive to the determining to route the requests, storing the mapping for the common identifier that is utilized to route the requests associated with the common identifier to the one or more request handling nodes, wherein the one or more request handling nodes are identified by the mapping for the common identifier;

receiving a request to be performed by the distributed system;

determining that the request to be performed by the distributed system is associated with the common identifier; and sending the request to the one or more request handling nodes.

15. The one or more non-transitory, computer-readable storage media of claim 14, storing further instructions that when executed by the one or more computing devices cause the one or more computing devices to further implement:

before sending the request, determining that the one or more request handling nodes are available to accept the request.

16. The one or more non-transitory, computer-readable storage media of claim 14, storing further instructions that when executed by the one or more computing devices cause the one or more computing devices to further implement:

evaluating the one or more criteria for determining whether to route requests associated with a different common identifier to another one or more request handling nodes of the distributed system;

responsive to determining not to route the requests to the other one or more request handling nodes according to the evaluation of the one or more criteria, allowing the requests associated with the different common identifier to be routed according to a load balancing scheme.

17. The one or more non-transitory, computer-readable storage media of claim 14, storing further instructions that when executed by the one or more computing devices cause the one or more computing devices to further implement:

tracking request performance history for the common identifier;

updating the performance profile for the requests associated with the common identifier;

determining that the updated performance profile is below a threshold criteria to retain the mapping; and removing the mapping for the common identifier.

18. The one or more non-transitory, computer-readable storage media of claim 14, storing further instructions that when executed by the one or more computing devices cause the one or more computing devices to further implement:

receiving another request determined to be associated with a different identifier;

determining that there is no mapping created for the different identifier; and sending the other request to one of the request handling nodes selected according to a load balancing scheme.

19. The one or more non-transitory, computer-readable storage media of claim 14, wherein one of the one or more criteria is a request to create the mapping for the common identifier received from one of the one or more request handling nodes.

20. The one or more non-transitory, computer-readable storage media of claim 14, wherein, in storing the mapping for the common identifier that routes the requests associated with the common identifier to the one or more request handling nodes, the program instructions cause the one or more computing devices to implement storing the mapping to a data store that persists the mapping separate from the load balancer.

* * * * *